United States Patent
Smith et al.

(10) Patent No.: US 12,406,565 B2
(45) Date of Patent: Sep. 2, 2025

(54) AEROSOL GENERATION DEVICE LOCATOR

(71) Applicant: RAI Strategic Holdings, Inc., Winston-Salem, NC (US)

(72) Inventors: Laura Smith, Winston-Salem, NC (US); Jared Aller, Winston-Salem, NC (US); Sean Lukan, Winston-Salem, NC (US); Rae McNeil, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 0 days.

(21) Appl. No.: 17/380,574

(22) Filed: Jul. 20, 2021

(65) Prior Publication Data
US 2022/0028245 A1   Jan. 27, 2022

Related U.S. Application Data

(60) Provisional application No. 63/054,452, filed on Jul. 21, 2020.

(51) Int. Cl.
*G08B 21/24* (2006.01)
*A24F 40/60* (2020.01)
(Continued)

(52) U.S. Cl.
CPC .............. *G08B 21/24* (2013.01); *A24F 40/60* (2020.01); *A24F 40/65* (2020.01); *G08B 3/10* (2013.01); *H04W 4/029* (2018.02)

(58) Field of Classification Search
CPC . G08B 21/24; G08B 3/10; A24F 40/60; A24F 40/65; H04W 4/029
See application file for complete search history.

(56) References Cited

U.S. PATENT DOCUMENTS 10,327,479 B2   6/2019   Popplewell et al.
11,043,086 B1 *  6/2021   Daoura ................. G08B 21/24
(Continued)

FOREIGN PATENT DOCUMENTS

JP         2018537714 A    12/2018
JP         2020513851 A    5/2020
(Continued)

OTHER PUBLICATIONS

Son et al., "Indoor Air Quality and Passive E-cigarette Aerosol Exposures in Vape-Shopes", Nicotene & Tobacco Research, May 18, 2020, retrieved on [Oct. 1, 2021]. Retrieved from the internet <URL: https://www.ncbi.nlm.nih.gov/pmc/articles/PMC7542645/pdf/ntaa094.pdf> entire document.
(Continued)

*Primary Examiner* — Brian Wilson
(74) *Attorney, Agent, or Firm* — BURR & FORMAN

(57) ABSTRACT

An attachable accessory for device location of an aerosol generation device may include a sleeve portion, a listening module and an alerting module. The sleeve portion may be configured to engage a portion of the aerosol generation device to operably couple the accessory to the aerosol generation device. The listening module may be configured to receive an alert signal from a user. The alerting module may be configured to issue an alert responsive to receipt of the alert signal by the listening module.

22 Claims, 4 Drawing Sheets

(51) Int. Cl.
*A24F 40/65* (2020.01)
*G08B 3/10* (2006.01)
*H04W 4/029* (2018.01)

(56) References Cited

U.S. PATENT DOCUMENTS

| | | |
|---|---|---|
| 2012/0018525 A1 | 1/2012 | Giroux et al. |
| 2015/0020832 A1 | 1/2015 | Greim et al. |
| 2015/0174348 A1 | 6/2015 | Tunnell et al. |
| 2015/0379859 A1* | 12/2015 | Nespolo ............ G08B 21/24 340/539.32 |
| 2017/0048928 A1* | 2/2017 | Gorilovsky ........... A61M 15/06 |
| 2017/0092106 A1 | 3/2017 | Cameron |
| 2017/0119053 A1 | 5/2017 | Henry, Jr. et al. |
| 2017/0154176 A1* | 6/2017 | Yun ..................... G06F 3/167 |
| 2017/0156397 A1 | 6/2017 | Sur et al. |
| 2018/0180752 A1* | 6/2018 | Gabai ................... G01V 1/001 |
| 2020/0000143 A1* | 1/2020 | Anderson ............. G06F 18/23 |
| 2020/0229492 A1* | 7/2020 | Wilson ................. A24F 40/46 |
| 2020/0352250 A1* | 11/2020 | Wood .................... A24F 40/60 |

FOREIGN PATENT DOCUMENTS

| | | |
|---|---|---|
| RU | 2680224 C2 | 2/2019 |
| RU | 2696147 C1 | 7/2019 |
| RU | 2705799 C2 | 11/2019 |
| RU | 2018144294 A | 7/2020 |
| WO | 2016156609 A1 | 10/2016 |

OTHER PUBLICATIONS

International Search Report and Written Opinion of International Application No. PCT/US2021/042558 dated Nov. 4, 2021, all pages cited in its entirety.

Extended European Search Report issued in corresponding European Patent Application No. 21846031.9 mailed Jul. 17, 2024, all pages cited in its entirety.

Office Action and Search Report (with English Translation) issued in corresponding Russian Patent Application No. 2023103761 mailed Feb. 27, 2025, all pages cited in its entirety.

Notice of Reasons for Refusal from corresponding Japanese Application No. 2023-504236, mailed Jul. 1, 2025, all pages cited in its entirety.

* cited by examiner

AEROSOL GENERATION DEVICE LOCATOR

TECHNICAL FIELD

Example embodiments generally relate to non-combustible aerosol provision systems and, in particular, relate to a locator device for use with an non-combustible aerosol provision device.

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as "electronic cigarettes," "e-cigarettes" or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called "open" systems). Therefore, in many cases, the consumable is sold separately from the device, and often in a multipack. Moreover, subsystems and some individual components of devices or consumables may be sourced from specialist manufacturers.

A common trait amongst these types of devices is that they are generally sized to be handheld for usability and transport. However, this size can also be a disadvantage in situations where a user misplaces the device or forgets where the device was last used.

BRIEF SUMMARY OF SOME EXAMPLES

In an example embodiment, an attachable accessory for device location of an aerosol generation device may be provided. The accessory may include a sleeve portion, a power module, a listening module and an alerting module. The sleeve portion may be configured to receive a portion of the aerosol generation device to operably couple the accessory to the aerosol generation device. The listening module and the alerting module may be powered via the power module. The listening module may be configured to receive an alert signal from a user. The alerting module may be configured to issue an alert responsive to receipt of the alert signal by the listening module.

In another example embodiment, a device locator system may be provided. The system may include an aerosol generation device, an accessory configured to be operably coupled to the aerosol generation device, and a power module. The accessory may include a listening module and an alerting module. The power module may be configured to power the listening module and the alerting module. The listening module may be configured to receive an alert signal from a user. The alerting module may be configured to issue an alert responsive to receipt of the alert signal by the listening module.

It will be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
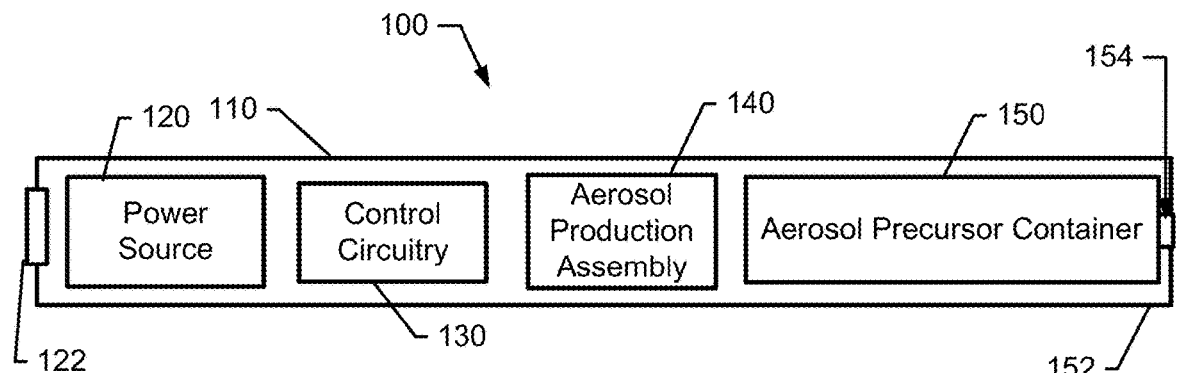
FIG. 1 illustrates a general block diagram of a non-combustible aerosol provision system that may be used in connection with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, non-combustible aerosol provision systems such as an ENDS device may, due to its size and form factor, become lost or misplaced from time to time. In order to facilitate location of the device, when lost or misplaced, some example embodiments may provide a locator assembly that can be attached to the device, and which can interact with a locating device (e.g., a smart phone or tablet) through wireless communication. When the locating device is used, the locating device may instruct the locator assembly to initiate an alert to facilitate user location of the locator assembly, and therefore also the device to which the locator assembly is attached.

Figure 2:
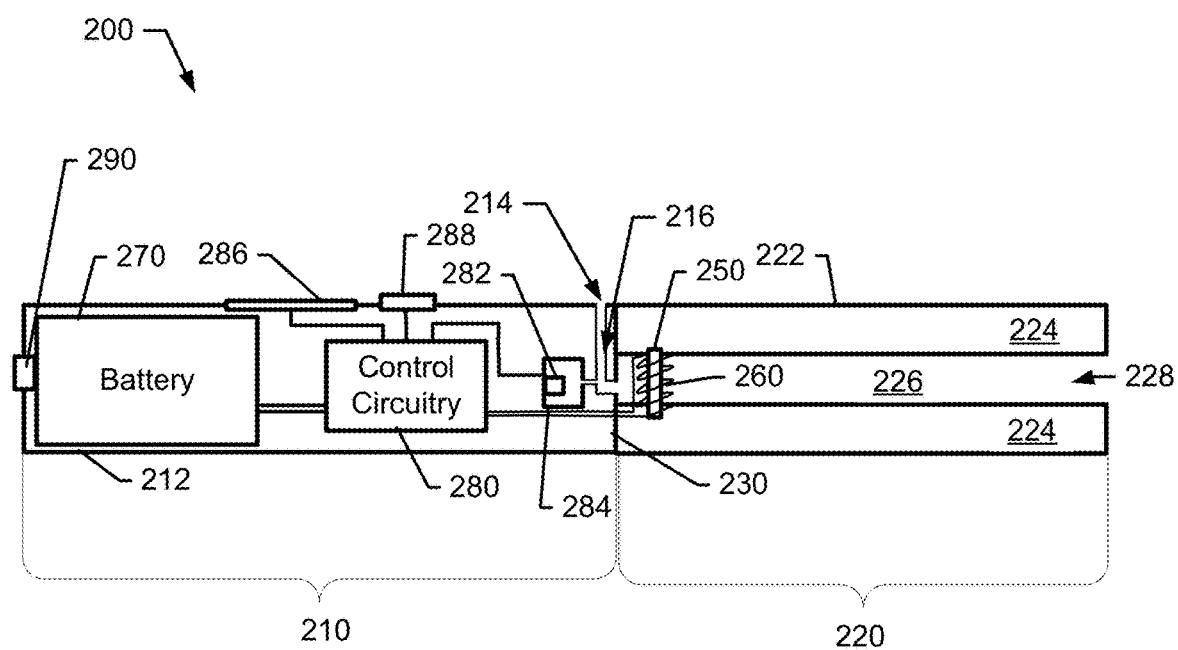
FIG. 2 illustrates a schematic representation of a partially cutaway view of an aerosol provision device that may be used in connection with an example embodiment.

Given that example embodiments may be employed in connection with location of non-combustible aerosol provision systems such as ENDS devices, a general description of an example device will be provided since some aspects of the locator assembly may be tailored to interface with such devices. In this regard, FIG. 1 illustrates a general block diagram of a non-combustible aerosol provision system that may be used in connection with an example embodiment. Meanwhile, FIG. 2 illustrates a schematic representation of a partially cutaway view of an ENDS device that may be used in connection with an example embodiment.

Referring first to FIG. 1, a non-combustible aerosol provision system 100 may include a housing 110 inside which a power source 120 and control circuitry 130 may be housed. The housing 110 may further include an aerosol production assembly 140 and an aerosol precursor container 150 inside which an aerosol precursor material (e.g., aerosolisable material) may be stored or contained. The housing 110 may be a single structure, or may be formed from two or more portions that are may be removable with respect to each other. For example, in an open system, the housing 110 may be a single structure with the aerosol precursor container 150 being refillable. However, for a closed system, the housing 110 may include at least one portion inside which the aerosol precursor container 150 is located, and when the aerosol precursor material is exhausted, the portion inside which the aerosol precursor container 150 is located may be removed for replacement with a new or full aerosol precursor container 150. In some examples with a removable portion inside which the aerosol precursor container 150 is located, the removable portion may be referred to as a cartridge.

The control circuitry 130 may be configured to detect or sense a puff event initiated by a user, and in response to detecting the puff event, the control circuitry 130 may actuate the aerosol production assembly 140 to transform the aerosol precursor material into an aerosol. The control circuitry 130 may therefore include a pressure sensor, a flow sensor, and/or any other suitable devices that can be configured to detect the puff event. A mouthpiece 152 defining an opening 154 in the housing 110 may be associated with the aerosol precursor container 150, and may be used by the user to initiate the puff event by inhaling at the mouthpiece 152. Accordingly, in response to the detection of the puff event, the aerosol may be produced by the aerosol production assembly 140 and delivered orally to the user via the mouthpiece 152.

The aerosol production assembly 140 may be configured to produce the aerosol from the aerosol precursor material using any suitable means. For example, the aerosol production assembly 140 may be embodied as a heat-not-burn device via which, for example, the aerosol is produced by exposing the aerosol precursor material to a heating element (e.g., an induction heater, conduction heater, dielectric heater, microwave heater, radiant heater, arc heater, electrical resistance heater, etc.). In such an example, the aerosol precursor material may be provided in a consumable that may be exposed to the aerosol production assembly 140 such that the heat thereof causes production of the aerosol from the aerosol precursor material. In some cases, the aerosol precursor material may include a substrate and/or a susceptor to facilitate the heating and aerosol release. Alternatively, in the case of a no-heat-no-burn device (e.g., nebulizer), the aerosol production assembly 140 may be embodied as or include a vibratable piezoelectric or piezomagnetic mesh. However, compressed gas, ultrasonic waves, surface acoustic waves, and other technologies may alternatively be employed. The nebulizer may be configured to break up the aerosol precursor material into an aerosol without heating the aerosol precursor material. In other words, heat generation may or may not be involved in the operation of the aerosol production assembly 140. Moreover, in some cases, the aerosol production assembly 140 may include a combination of elements, which can include both a heating element and an additional element, such as a vibrating aerosol production component (e.g., a vibratable piezoceramic and/or other piezoelectric or piezomagnetic material) that cooperate to produce aerosol from an aerosol precursor material. Such combinations may be referred to as hybrid products.

The aerosol precursor material may be a solid, semi-solid, or liquid material. As such, the aerosol precursor container 150 may be configured to retain the aerosol precursor material in whatever form such material may take. In some cases, the aerosol precursor container 150 may be a reservoir configured to store liquid that is operably coupled to the aerosol production assembly 140 (e.g., directly or indirectly) for the generation of the aerosol as described above. In some examples, the aerosol precursor material may be provided in a substrate (e.g., coated or absorbed on/in the substrate) such that the aerosol precursor material may be integrated in, stored in, or deposited on the substrate prior to being used for generation of the aerosol.

The power source 120 may be a replaceable or rechargeable battery. Rechargeable batteries may be useful to avoid or limit production of waste materials, and to facilitate ease of operation. To facilitate recharging of the power source 120, a charge interface 122 may be provided. The charge interface 122 may include a USB (Universal Serial Bus) port or other charge port into which a charger cord or other charging device may be plugged or inserted. The charge interface 122 may therefore form a penetration or opening in the housing 110.

FIG. 2 is a cross-sectional view through one example non-combustible aerosol provision device 200 that may be implemented in connection with an example embodiment. The non-combustible aerosol provision device 200 is one more detailed example of the non-combustible aerosol provision system 100 of FIG. 1. The non-combustible aerosol provision device 200 of FIG. 2 is a two-part device (i.e., a closed system), which includes a control unit 210 and a cartridge 220. The cartridge 220 may be referred to as a consumable part (or replaceable/disposable part) and the control unit 210 may be referred to as a reusable part.

In normal use the control unit 210 and the cartridge 220 may be releasably coupled together at a coupling interface 230. When the cartridge 220 is exhausted or the user simply wishes to switch to a different cartridge 220 (e.g., for a different flavor), the cartridge 220 may be removed from the control unit 210 and a replacement (i.e., a different or new instance of the cartridge 220) may be attached to the control unit 210 in place of the original cartridge 220. The coupling interface 230 may provide a structural, electrical and/or air path connection between the cartridge 220 and the control unit 210, and may be established in accordance with conventional techniques, which may include a screw thread, latch mechanism, or bayonet fixing with appropriately arranged electrical contacts and openings for establishing the electrical connection and air path between the cartridge 220 and the control unit 210 as appropriate. The specific manner by which the cartridge 220 mechanically mounts to the control unit 210 is not significant to the principles described herein, but for the sake of a concrete example is assumed here to comprise a latching mechanism, for example with a portion of the cartridge 220 being received in a corresponding receptacle in the control unit 210 with cooperating latch engaging elements. It will also be appreciated the coupling interface 230 in some implementations may not support an electrical connection between the respective parts. For example, in some implementations a vaporiser may be provided in the control unit 210 rather than in the cartridge 220.

The cartridge 220 may include a consumable housing 222 (e.g., as an example of the aerosol precursor container 150 of FIG. 1). The consumable housing 222 may be formed of a plastic, composite or metallic material. The consumable housing 222 may support other components of the cartridge 220 and provide support for a portion of the mechanical coupling interface 230 with the control unit 210. The consumable housing 222 in this example is generally circularly symmetric about a longitudinal axis along which the cartridge 220 couples to the control unit 210. The consumable housing 222 of this example may have a length of about 4 cm and a diameter of around 1.5 cm. However, it will be appreciated the specific geometry, and more generally the overall shapes and materials used, may be different in different implementations.

A reservoir 224 may be provided within the consumable housing 222 to contain liquid aerosolisable material (e.g., the aerosol precursor material of FIG. 1). The aerosolisable material may be referred to as e-liquid in some examples. The liquid reservoir 224 in this example has an annular shape, though it will be appreciated that other shapes are within the scope of the disclosure, with an outer wall defined by the consumable housing 222 and an inner wall that defines an air path 226 through the cartridge 220. The reservoir 224 is closed at each end with end walls to contain the e-liquid. The reservoir 224 may be formed in accordance with conventional techniques and may, for example, be formed of a plastic material integrally molded with the consumable housing 222. The opening of the air path 226 at the end of the cartridge 220 provides a mouthpiece outlet 228 for the non-combustible aerosol provision system through which a user inhales aerosol generated by the non-combustible aerosol provision device 200 during use.

The cartridge 220 of this example may further include a wick 250 and a heater element 260 (e.g., a vaporiser) located proximate to an end of the reservoir 224 opposite to the mouthpiece outlet 228. In this example the wick 250 extends transversely across the air path 226 with ends thereof extending into the reservoir 224 of e-liquid through openings in the inner wall of the reservoir 224. The openings in the inner wall of the reservoir 224 may be sized to broadly match the dimensions of the wick 250 to provide a reasonable seal against leakage from the reservoir 224 into the air path 226 without unduly compressing the wick 250, which may be detrimental to fluid transfer performance.

The wick 250 and heater element 260 may be arranged in the air path 226 of the cartridge 220 such that a region of the air path 226 around the wick 250 and heater element 260 in effect defines a vaporisation region for the cartridge 220. E-liquid in the reservoir 224 infiltrates the wick 250 through the ends of the wick 250 that extend into the reservoir 224 and is drawn along the wick 250 by surface tension/capillary action (i.e. wicking). The heater element 260 in this example may be embodied as an electrically resistive wire coiled around the wick 250. In this example, the wick 250 may be a glass fibre bundle, but other configurations are also possible. In use, electrical power may be supplied to the heater element 260 to vaporise an amount of e-liquid (e.g., aerosolisable material) drawn to the vicinity of the heater element 260 by the wick 250. Vaporised e-liquid may then become entrained in air drawn along the air path 226 from the vaporisation region to form a condensation aerosol that exits the system through the mouthpiece outlet 228 for user inhalation. Thus electrical power can be applied to the heater element 260 to selectively generate aerosol from the e-liquid in the cartridge 220. When the device is in use and generating aerosol, the amount of power supplied to the heater element 260 may be varied, for example through pulse width and/or frequency modulation techniques, to control the temperature and/or rate of aerosol generation as desired.

The control unit 210 may include an outer housing 212 (e.g., as a portion of the housing 110 of FIG. 1) with an opening that defines an air inlet 214 for the non-combustible aerosol provision device 200. The non-combustible aerosol provision device 200 may also include, within the outer housing 212, a battery 270 for providing operating power for the non-combustible aerosol provision device 200. The battery 270 may be operably coupled to control circuitry 280 configured for controlling and monitoring the operation of the non-combustible aerosol provision device 200. The battery 270 may be an example of the power source 120, and the control circuitry 280 may be an example of the control circuitry 130 of FIG. 1.

The control circuitry 280 may be operably coupled to an inhalation sensor 282 (e.g., puff detector), which in this example comprises a pressure sensor located in a pressure sensor chamber 284. The control circuitry 280 may also be operably coupled to a visual display 286 (which may be optional). The visual display 286 may include one or more lights configured to indicate various status conditions of the non-combustible aerosol provision device 200 based on light color, flash sequences, or other indications. Alternatively or additionally, the visual display 286 may be configured to display characters, images and/or the like via a liquid crystal display (LCD) screen, one or more light emitting diodes (LEDs) or other display options. Thus, the visual display 286 may be provided to give a user a visual indication of various characteristics associated with the non-combustible aerosol provision device 200. For example, the visual display 286 may provide information indicative of current power and/or temperature setting information, remaining battery power, and so forth. As an alternative (or in addition) to the visual display 286, some example embodiments may include other means for providing a user with information relating to operating characteristics of the non-combustible aerosol provision device 200 such as, for example, using audio signalling or haptic feedback.

The control circuitry 280 may be configured to monitor the output from the inhalation sensor 282 to determine when a user is inhaling through the mouthpiece opening 228 of the cartridge 220 so that power can be automatically supplied to the heating element 260 to generate aerosol in response to user inhalation. In other implementations, as an alternative to automatic operation of the heating element 260, a button 288 may be provided instead of the inhalation sensor 282, and power may be supplied to the heating element 260 in response to a user manually activating the button 288 to trigger aerosol generation. Thus, the button 288 may also be entirely optional and omitted in some cases.

The outer housing 212 may be formed, for example, from a plastic or metallic material and may be shaped to have any desirable profile. In some examples, the outer housing 212 may be substantially cylindrical and therefore have a circular cross-section generally conforming to the shape and size of the cartridge 220 so as to provide a smooth transition between the two parts at the coupling interface 230. In some examples, the control unit 210 may have a length of around 8 cm so the overall length of the non-combustible aerosol provision device 200 when the cartridge 220 and control unit 210 are operably coupled together is around 12 cm. However, and as already noted, it will be appreciated that the overall shape and scale of components may be changed in different example embodiments without altering the principles described herein.

The air inlet 216 connects to an air path 216 through the control unit 210. The air path 216 of the control unit 210 in turn connects to the air path 226 of the cartridge 220 across the coupling interface 230 when the control unit 210 and cartridge 220 are operably coupled together. The pressure sensor chamber 284 containing the pressure sensor 282 may be in fluid communication with the air path 216 in the control unit 210 (i.e. the pressure sensor chamber 284 branches off from the air path 214 in the control unit 210). Thus, when a user inhales on the mouthpiece opening 228, there is a drop in pressure in the pressure sensor chamber 284 that may be detected by the pressure sensor 282 and also air is drawn in through the air inlet 214, along the air path 216 of the control unit 210, across the coupling interface 230, through the aerosol generation region in the vicinity of the heating element 260 (where an aerosol generated from the aerosolisable material becomes entrained in the air flow when the heating element 260 is active), along the air path 226 of the cartridge 220, and out through the mouthpiece opening 228 for user inhalation.

The battery 270 in this example is rechargeable and may be recharged via charging connector 290. In this regard, the battery 270 may be recharged through an opening in the control unit housing 212 at which the charging connector 290 is formed, and to which a charging plug or other charging device may be operably coupled. The charging connector 290 may take any suitable configuration including, for example, a USB connector, other standard power connectors, or even proprietary charging connections.

The control circuitry 280 may be configured or programmed to control the operation of the non-combustible aerosol provision device 200 to provide various functions thereof. The control circuitry 280 may be considered to logically comprise various sub-units or circuitry elements associated with different aspects of the operation of the non-combustible aerosol provision device 200 in accordance with the principles described herein and other conventional operating aspects of non-combustible aerosol provision devices 200, such as display driving circuitry and user input detection. It will be appreciated the functionality of the control circuitry 280 can be provided in various different ways such as, for example, using one or more suitably programmed programmable computer(s) and/or one or more suitably configured application-specific integrated circuit(s)/circuitry/chip(s)/chipset(s) configured to provide the desired functionality.

In some cases, the non-combustible aerosol provision device 200 may have three basic operating states. However, additional or different operating states are also possible. The three basic operating states may include an "off" state, an "on" state, and a "standby" state. In the off state, the non-combustible aerosol provision device 200 may unable to generate aerosol (i.e. the control circuitry 280 may prevent supplying of power to the heating element 260 in the off state). The non-combustible aerosol provision device 200 may, for example, be placed in the off state between use sessions, for example, when the non-combustible aerosol provision device 200 might be set aside or placed in a user's pocket or bag. In the on (or active) state, the non-combustible aerosol provision device 200 may be enabled to actively generate aerosol (e.g., the control circuitry 280 may provide (or enable provision of) power to the heating element 260). The non-combustible aerosol provision device 200 will thus typically be in the on state when a user is in the process of inhaling aerosol from the non-combustible aerosol provision device 200. In the standby state the non-combustible aerosol provision system may be ready to generate aerosol (e.g., ready to apply power to the heater element 260 of the illustrated embodiment) in response to user activation, but may not currently be doing so. The non-combustible aerosol provision device 200 will typically be in the standby state when a user initially exits the off state to begin a session of use (e.g., when a user initially turns on the non-combustible aerosol provision device 200), or between uses during an ongoing session of use (e.g., between puffs when the user is using the non-combustible aerosol provision device 200). It is more common for examples of the non-combustible aerosol provision device 200 using liquid aerosolisable material to revert to the standby mode between puffs, whereas non-combustible aerosol provision devices 200 using solid aerosolisable material may more often remain on between puffs to seek to maintain the aerosolisable material at a desired temperature during a session of use comprising a series of puffs.

To generate an aerosol in the non-combustible aerosol provision device 200, electrical power from the battery 270 is supplied to the heater element 260 under control of the control circuitry 280. When the non-combustible aerosol provision device 200 is on, i.e. actively generating an aerosol, power may be supplied to the heater element 260 in a pulsed fashion, for example, using a pulse width modulation (PWM) scheme to control the level of power being delivered. Thus, the power supplied to the heater element 260 during a period of aerosol generation may comprise an alternating sequence of on periods during which power is connected to the electric heater and off periods during power is not connected to the heater element 260. The cycle period for the pulse width modulation (i.e. the duration of a neighbouring pair of an off and an on period) is in this example 0.020 s (20 ms) (i.e. the pulse width modulation frequency is 50 hertz). The proportion of each cycle period during which power is being supplied to the heater (i.e. the length of the on period) as a fraction of the cycle period is the so-called duty cycle for the pulse width modulation. In accordance with certain embodiments of the disclosure, the control circuitry of the non-combustible aerosol provision system may be configured to adjust the duty cycle for the pulse width modulation to vary the power supplied to the heater, for example to achieve a target level of average power or to achieve a target temperature.

As noted above, when the non-combustible aerosol provision device 200 is in the off state, it is common for the user to store the non-combustible aerosol provision device 200 in a pocket or bag, or otherwise set the non-combustible aerosol provision device 200 aside. Invariably, some users will forget where they last put or saw the non-combustible aerosol provision device 200, and a search for the device may prove necessary before it can be located. These situations can be frustrating, particularly when the resulting search is extended or unsuccessful. Accordingly, it may be desirable to provide a way by which to ensure that the non-combustible aerosol provision device 200 can be located quickly when its location is not immediately apparent. Some example embodiments may address this issue by providing an attachable accessory 300 that makes the non-combustible aerosol provision device 200, when the attachable accessory 300 is attached thereto, trackable or discoverable. An example of the attachable accessory 300 is shown and will be described in reference to FIG. 3.

In an example embodiment, the attachable accessory 300 may be configured specifically for connection to the non-combustible aerosol provision device 200 in order to retain a sleek and appealing appearance. However, the attachable accessory 300 may further be configured to provide additional functionality that enables location of the non-combustible aerosol provision device 200. As such, when connected together, the combination of the non-combustible aerosol provision device 200 and the attachable accessory 300 may form a device locator system for locating the non-combustible aerosol provision device 200.

In some example embodiments, the attachable accessory 300 may be configured to communicate wirelessly with a wireless communication device 310 such as a cell phone, laptop or tablet. However, a dedicated paging device may also be employed in some examples. In some embodiments in which a dedicated paging device is employed, the dedicated paging deice may, for example, have the form factor of a key fob. Regardless of the specific form of the wireless communication device 310, the user may be able to use the wireless communication device 310 to trigger the attachable accessory 300 to initiate an alert that may enable the user to locate the attachable accessory 300, and therefore also the non-combustible aerosol provision device 200. As such, for example, the alert may often be audible, although the alert may also or alternatively include visual or haptic outputs as well. For example, visual alerts could include an indication of a location of or to the device being provided (e.g., on the display of the cell phone, laptop, tablet, etc.) For example, a relative location indication (e.g., directional pointer) may be provided and the indication may get stronger as the user gets closer to the location of the device (and weaker as the user gets farther from the device). The same strategy regarding strength of indication could also be employed for audible (e.g., louder and/or more frequent audible sound as the user gets closer to the location of the device and softer and/or less frequent audible sound as the user gets farther from the device) and haptic feedback (e.g., stronger and/or more frequent haptic feedback as the user gets closer to the location of the device and softer and/or less frequent haptic feedback as the user gets farther from the device). Relative location could also or alternatively be indicated visually in manners ranging from distance between two points—e.g., one representative of aerosol device and one of mobile device/user; a color representative of relative distance (e.g., red for relatively longer distance, green for close distance, etc.); intensity of light (e.g., brighter for closer proximity), etc.

The attachable accessory 300 may include a housing 320 that is configured to engage, mate with or otherwise interface with the non-combustible aerosol provision device 200 in a way that securely attaches the respective devices together. In this regard, in some cases, the attachable accessory 300 may be constructed to include a sleeve portion 322 formed in the housing 320. The sleeve portion 322 may have an internal diameter and/or shape that is configured to substantially match an external shape, such as a diameter or other cross-sectional profile, of the control unit 210 (or another portion of the non-combustible aerosol provision device 200). However, the sleeve portion 322 could engage the non-combustible aerosol provision device 200 in other ways, and take numerous forms. For example, a distal end of the control unit 210 (relative to the cartridge 220) may be configured to slide into and be received inside the sleeve portion 322 as shown by arrow 324 in FIG. 3. A cross-sectional profile (e.g., diameter) of the sleeve portion 322 may taper slightly as it proceeds inwardly into the housing 320 such that the control unit 210 and the sleeve portion 322 may stay in contact with each other by friction responsive to insertion of the control unit 210 into the sleeve portion 322. However, in alternative embodiments, other fixing methods (including latching mechanisms and/or the like) may be employed.

In this regard, for example, the housing 320 may include portions that are attached via a hinge that can be opened to allow the non-combustible aerosol provision device 200 to be inserted into the housing 320, and then closed to retain the non-combustible aerosol provision device 200 in the housing 320. The hinge may be a separate component, or may be a living hinge (i.e., formed from the same material forming the portions of the housing 320, which are joined). Another alternative example may include a case with flexible sides or portions. The sides or portions may be biased toward a closed (engagement) position, such that the sides or portions can be manipulated away from the closed (engagement) position to an open position in order to facilitate insertion of and/or engagement with the non-combustible aerosol provision device 200. When the non-combustible aerosol provision device 200 has been positioned in the housing 320, the force used to manipulate the sides or portions to the open position may be removed, and the sides or portions may release and return to the closed (engagement) position to retain the non-combustible aerosol provision device 200 in the housing 320.

The housing 320 and sleeve portion 322 may be configured to leave any desirable portions of the control unit 210 (and all of the cartridge 220) exposed. Thus, for example, the sleeve portion 322 may not extend along the control unit 210 as far as the coupling interface 230. Moreover, to the extent the visual display 286 and/or button 288 are included on the control unit 210, the sleeve portion 322 and the housing 320 may be configured to leave both the visual display 286 and/or button 288 exposed. Accordingly, the attachable accessory 300 may be attached to the control unit 210 without negatively inhibiting the functionality of the non-combustible aerosol provision device 200 in any way.

Figure 3:
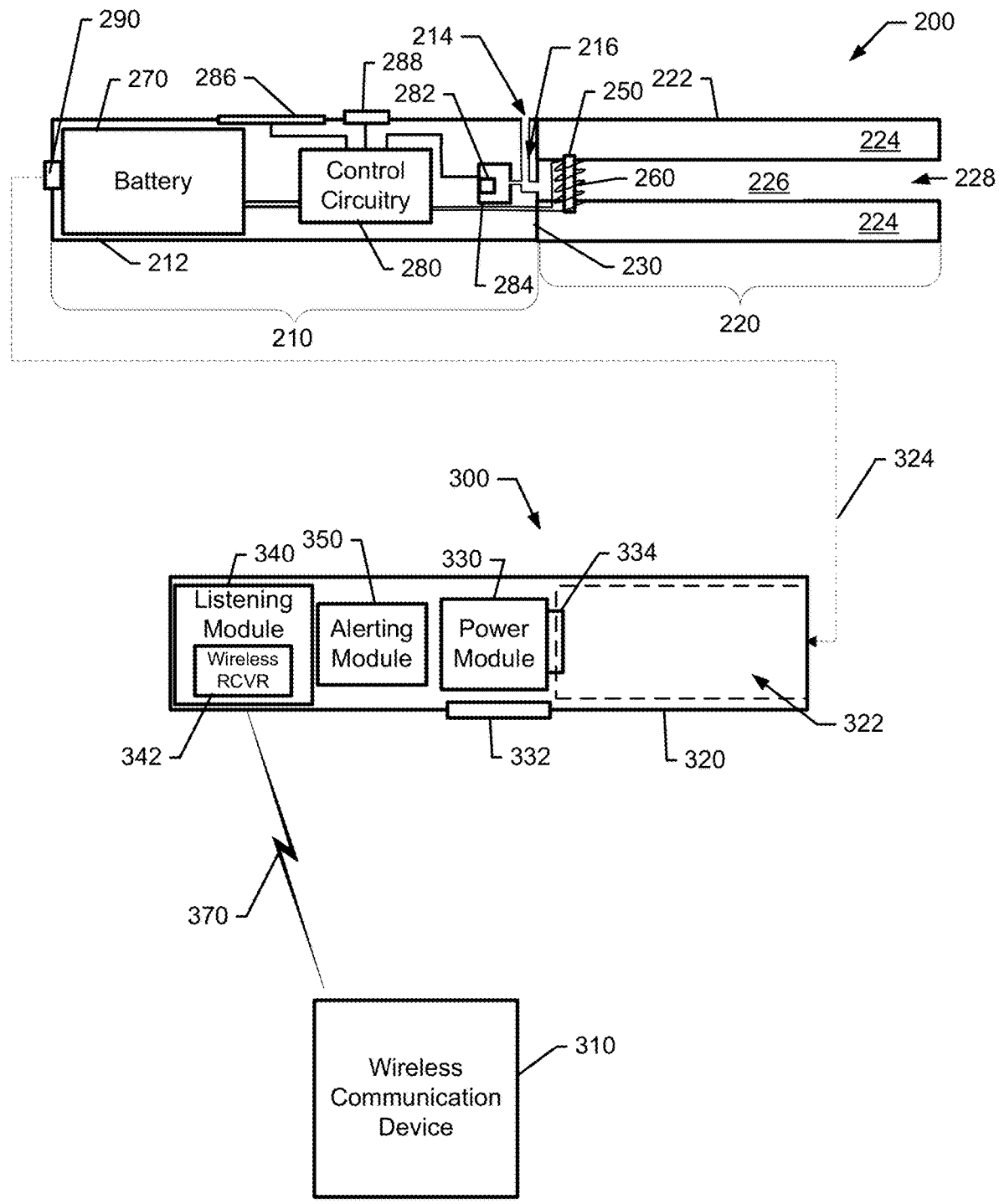
FIG. 3 is a schematic view of the device of FIG. 2 being operably coupled to an attachable accessory for locating the device using a wireless alert signal in accordance with an example embodiment.

As shown in FIG. 3, the attachable accessory 300 may include a number of modules that may be configured to perform respective functions of the attachable accessory 300. Although it may be possible to power the attachable accessory 300 from the battery 270 of the non-combustible aerosol provision device 200 (or the power source 120 of non-combustible aerosol provision system 100 of FIG. 1), doing so may drain the battery 270 faster, and cause users to be dissuaded from using the attachable accessory 300. Accordingly, it may instead be desirable to power the attachable accessory 300 via its own separate power source. Thus, the attachable accessory 300 may include a power module 330.

In some examples, the power module 330 may be a rechargeable or replaceable battery. Moreover, in some cases, the power module 330 may be a Lithium ion battery or other battery that can provide significant power in a relatively small form factor. By providing the power module 330 as a separate power source relative to the battery 270 of the non-combustible aerosol provision device 200, not only may the functioning of the non-combustible aerosol provision device 200 not be negatively impacted by operation and current usage by the attachable accessory 300, but the non-combustible aerosol provision device 200 may be located even when powered off, or when the battery 270 is dead.

In some cases, the power module 330 may not only be separate from the battery 270 (i.e., two respective separate battery packs or cells), but the power module 330 could also be entirely independent of the battery 270. In other words, there may be no connection between the battery 270 of the non-combustible aerosol provision device 200 and the power module 330 of the attachable accessory 300. Thus, the battery 270 of the non-combustible aerosol provision device 200 may only provide power to the non-combustible aerosol provision device 200 and the power module 330 of the attachable accessory 300 may only provide power to the attachable accessory 300. In such a case, the attachable accessory 300 may be constructed to avoid interference with accessibility of the charging connector 290 of the non-combustible aerosol provision device 200 to enable recharging of the battery 270 even when the control unit 210 is mated with the attachable accessory 300. The power module 330 may therefore include a charge port 332 that enables the power module 330 to be charged whether or not the power module 330 is operably coupled to the control unit 210, and both the battery 270 and the power module 330 could be separately (and possibly even simultaneously) charged via the charging connector 290 and the charge port 332, respectively.

In other examples, the battery 270 and the power module 330 may not be independent of each other. To the contrary, for example, the power module 330 may power the attachable accessory 300, but also be capable of powering the non-combustible aerosol provision device 200 either directly (e.g., by connection to the control circuitry 280) or indirectly (e.g., by charging the battery 270). In this regard, for direct powering, the power module 330 may provide power to the control circuitry 280 when the battery 270 is either dead or below a threshold level of charge. For indirect powering, the power module 330 may be configured to interface with the battery 270 to charge the battery 270. For example, the power module 330 may include a charging interface 334 configured to mate with the charging connector 290 of the control unit 210 when the control unit 210 is inserted into the sleeve portion 322. When the charging interface 334 is mated with the charging connector 290, the power module 330 may be operably coupled to the battery 270 to enable the battery 270 to be charged. Thus, for example, the power module 330 may be configured to supply a higher voltage than the battery 270 so that, when operably coupled to each other, the battery 270 may be charged.

In such an example, the control circuitry 280 operation may be unimpeded in that the control circuitry 280 may still only supply power to the heater element 260 responsive to detecting the puff event, and the power may be still supplied from the battery 270. However, the battery 270 could be charged either simultaneously or at other (i.e., non-operational) times for the heater element 260. Thus, in some cases, charging from the power module 330 to the battery 270 may only be possible when the non-combustible aerosol provision device 200 is not operating. In some cases, the power module 330 may only charge the battery 270 when the non-combustible aerosol provision device 200 is in the off state. In other cases, charging from the power module 330 to the battery 270 may only be possible when the non-combustible aerosol provision device 200 is in the off state or the standby state. However, it is also possible, as noted above, for charging during the on state in some cases. In some cases, the power module 330 may be configured to receive information indicative of the state of the non-combustible aerosol provision device 200, and control charging of the battery 270 (or provision of power directly to the control circuitry 280) based on the information received. Thus, for example, charging could be stopped when the non-combustible aerosol provision device 200 is active and/or in the standby status.

As shown in FIG. 3, the attachable accessory 300 may further include a listening module 340 and an alerting module 350. The listening module 340 may take multiple forms in accordance with different optional embodiments. In this regard, for example, in the example of FIG. 3, the listening module 340 may include or otherwise be embodied as a wireless receiver 342 configured to communicate with the wireless communications device 310. Although the listening module 340 may, in some cases, include a transceiver to permit two-way communication with the wireless communications device 310, such two-way communication is not necessary in all embodiments. Thus, in some embodiments, only one-way communication (i.e., from the wireless communications device 310 to the listening module 340) may be supported in order to reduce complexity and cost of the attachable accessory 300, and increase the battery life of the power module 330.

The wireless receiver 342 (or transceiver) of the listening module 340 may include one or more antennas, and corresponding radio circuitry configured to enable the listening module 340 to receive and process wireless signals (e.g., wireless alert signal 370). As such, the wireless receiver 342 of the listening module 340 may be ready to receive wireless communication signals at any time while receiving power from the power module 330. The readiness to receive such signals may be continuous, or may be periodic (e.g., with periodic cyclic listening periods being defined) to reduce battery power consumption. In some cases, the wireless communication between the listening module 340 and the wireless communications device 310 may be conducted via a short range wireless communication protocol (e.g., Bluetooth, Zigbee, WiFi, etc.).

The alerting module 350 may be configured to generate a sound, light, and/or haptic output in response to triggering from the listening module 340, which may (as noted above) further include information indicative of proximity and/or relative location based, for example, on two-way communication and signal strength measurement with or without directional discrimination capability. In this regard, responsive to receiving communications from the wireless communications device 310 (either at all, or specifically requesting an alert be issued), the alerting module 350 may issue the alert. In an example embodiment, the wireless communications device 310 may be configured to execute an application or function that sends a signal to the wireless receiver 342 of the listening module 340. For example, the user may launch an application at the wireless communications device 310 for locating the non-combustible aerosol provision device 200 (e.g., a "find my device" app). When launched, the application may include one or more simple commands for controlling operation of the components of the device locator system. For example, the application may include a locate device command and a stop locating command. In response to user selection of the locate device command, the wireless communications device 310 may send a trigger signal or a continuous alerting signal to the wireless receiver 342 of the listening module 340. In response to the trigger signal or continuous alerting signal, the wireless receiver 342 of the listening module 340 may signal the alerting module 350 to begin generation of the alert.

In some cases, the alerting module 350 may be configured to continue to generate the alert for as long as the wireless receiver 342 of the listening module 340 is in receipt of the continuous alerting signal. The continuous alerting signal may be communicated from the wireless communications device 310 until the device is found and the user selects an icon or button on the wireless communications device 310 to stop sending the continuous alerting signal 310. However, if the trigger signal is instead employed, the alerting module 350 may be configured to continue to generate the alert after receipt of the trigger signal until another signal (either a stop signal, or a second instance of the trigger signal) is received to indicate that the device has been found or located. As an alternative, the alerting module 350 may be configured to provide the alert until a predetermined period of time (e.g., 10 seconds, 20 seconds, 30 seconds, etc.) has passed. After the predetermined period of time has passed, either the device will be found, or another user selection of the locate device command at the wireless communications device 310 may be issued if continued searching (and alerting) is desired.

Figure 4:
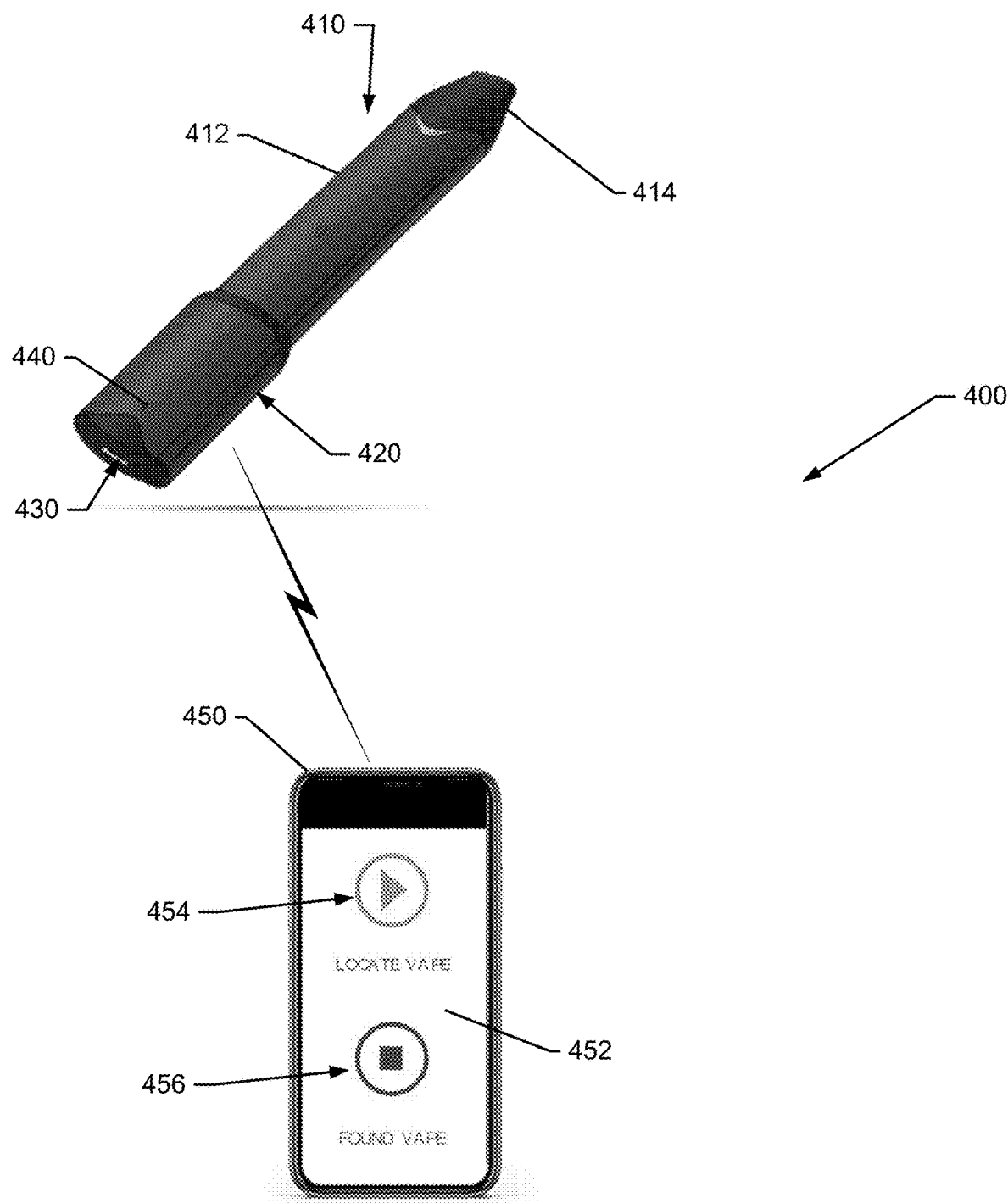
FIG. 4 illustrates specific form factors that may be employed in accordance with an example embodiment.

FIG. 4 illustrates a specific example of form factor and device options that may be employed to define a device locator system 400 in accordance with an example embodiment. In this regard, FIG. 4 illustrates an aerosol generation device 410 (e.g., an example of either the non-combustible aerosol provision system 100 of FIG. 1 or the non-combustible aerosol provision device 200 of FIGS. 2 and 3). The aerosol generation device 410 includes a control unit 412 and cartridge 414 that are similar to the components of the same name discussed above in reference to FIGS. 2 and 3. The control unit 412 of this example does not have a circular cross section, but instead has a substantially oval cross section, which demonstrates the variability in shape and size that may exist for control units. In any case, attachable accessory 420 is configured to interface with the control unit 412 similar to the manner described above in reference to FIG. 3. Moreover, the attachable accessory 420 includes a charge port 430 and a speaker 440. The charge port 430 may be used for charging the battery of the attachable accessory 420, and the speaker 440 may be an example of an alerting device used to issue the alert (i.e., a whistle, beep, tone, or other audible alerting sound).

The attachable accessory 420 may also include a wireless receiver that triggers actuation of the speaker 440 responsive to receipt of an alert signal (e.g., a trigger signal or continuous alerting signal described above) from a smart phone 450. The smart phone 450 may be an example of a wireless communication device 310, and a display 452 thereof may provide commands (e.g., start command 454 and stop command 456) for selection by the user.

The user of the smart phone 450 may select an icon to launch a device locator application, and the interface screen shown on the display 452 of FIG. 4 (or something similar) may be presented. The user may then select the start command 454, which may cause the smart phone 450 to issue the alert signal to the attachable accessory 420. The wireless receiver on the attachable accessory 420 may then trigger the speaker 440 to generate the alert. If within earshot, the user may then follow the sound of the alert until the attachable accessory 420 (and therefore also the aerosol generation device 410 to which the attachable accessory 420 is attached) is located. Once the attachable accessory 420 is located, the stop command 456 may be selected at the smart phone 450 in order to stop generation of the alert. As noted above, the alert may time out in some cases if the attachable accessory 420 is not found within a predetermined period of time.

Figure 5:
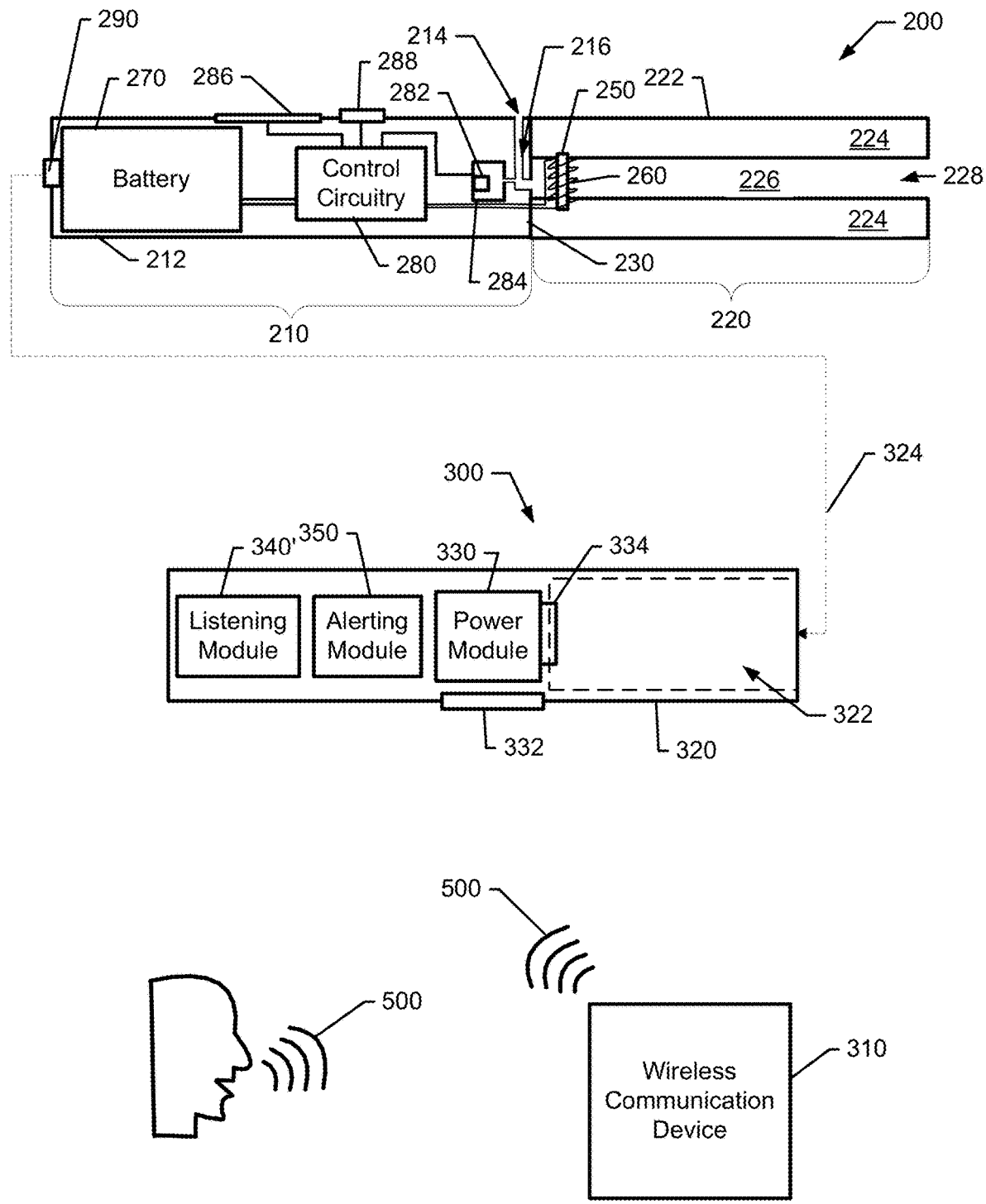
FIG. 5 illustrates a schematic view of the device of FIG. 2 being operably coupled to an attachable accessory for locating the device using an audible alert signal in accordance with an example embodiment.

As noted above, the listening module 340 can also take other forms. For example, as shown in FIG. 5, a different version of listening module 340' is provided. Other than the form and function of the listening module 340' of this example, the attachable accessory 300 may be substantially similar or identical to that described above. Meanwhile, the listening module 340' may not receive wireless signals, but may instead receive audible signals. As such, the listening module 340' may include a microphone or other audio sensor device. Thus, rather than "listening" for a wireless communication signal as an alert signal (as was the case for the examples of FIGS. 3 and 4), the listening module 340' of FIG. 5 may be configured to "listen" for an audible form of the alert signal (i.e. audible alert signal 500).

The audible form of the alert signal may be a key word, key sound, or even a tone that could be played by the wireless communication device 310. In this regard, for example, the application mentioned above may cause the wireless communication device 310 to issue the alert signal in the form of an audible key word, key sound or tone that is received at the listening module 340' to trigger the alerting module to issue the alert as described above. Since the alert signal is audible, it should also be appreciated that the alert signal could directly be issued by the user. For example, the user may speak the key word or key sound to trigger the alert from the attachable accessory 300 as long as the attachable accessory 300 is within range of the user and can receive the audibly generated alert signal. In some cases, the user may pre-record the key word or key sound to program the listening module 340' to recognize the key word or key sound.

Accordingly, as can be appreciated from the examples above, an attachable accessory for device location of an aerosol generation device may be provided in accordance with an example embodiment. The accessory may include a sleeve portion, a listening module and an alerting module. The sleeve portion may be configured to engage a portion of the aerosol generation device to operably couple the accessory to the aerosol generation device. The listening module may be configured to receive an alert signal from a user. The alerting module may be configured to issue an alert responsive to receipt of the alert signal by the listening module.

The attachable accessory may include a number of modifications, augmentations, or optional additions, some of which are described herein. The modifications, augmentations or optional additions listed below may be added in any desirable combination. Within this context, the attachable accessory described above may be considered a first embodiment, and other embodiments may be defined by each respective combination of modifications, augmentations or optional additions. For example, a second embodiment may be defined in which the alerting module may include a speaker configured to issue the alert as an audible sound (e.g., whistle, tone or pulse). In an example embodiment, a third embodiment may be defined in which the alerting module may be configured to issue the alert for a predetermined period of time. The third embodiment may be combined with any or all of embodiments one and two. In some cases, a fourth embodiment may be defined in which the alerting module may be configured to issue the alert until an instruction to stop issuing the alert is received. The fourth embodiment may be combined with any or all of embodiments one to three. In an example embodiment, a fifth embodiment may be defined in which the sleeve portion may be formed in a housing of the accessory, the accessory may further include a power module, and the housing may further include a charge port via which the power module is rechargeable from an external power source. The fifth embodiment may be combined with any or all of embodiments one to four. In some cases, a sixth embodiment may be defined in which the power module may be configured to provide power (directly or indirectly) to a battery of the aerosol generation device. The sixth embodiment may be combined with any or all of embodiments one to five. In an example embodiment, a seventh embodiment may be defined in which the listening module may be configured to receive the alert signal in the form of an audible key word or key sound generated (e.g., uttered or spoken) by the user. The seventh embodiment may be combined with any or all of embodiments one to six. In some cases, an eighth embodiment may be defined in which the audible key word or key sound may be pre-programmed into the listening module by the user. The eighth embodiment may be combined with any or all of embodiments one to seventh. In an example embodiment, a ninth embodiment may be defined in which the listening module may include a wireless receiver configured to communicate wirelessly with a wireless communication device to receive the alert signal as a wireless alert signal sent by the wireless communication device, responsive to a request from the user. The ninth embodiment may be combined with any or all of embodiments one to eight. In some cases, a tenth embodiment may be defined in which the wireless signal may be sent responsive to activation of the wireless communication device via an application executed by the user at the wireless communication device. The tenth embodiment may be combined with any or all of embodiments one to nine. In an example embodiment, an eleventh embodiment may be defined in which the application may include selectable icons for initiating sending of the alert signal and stopping the sending of the alert signal. The eleventh embodiment may be combined with any or all of embodiments one to ten.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An attachable accessory for device location of an aerosol generation device that includes a power source comprising a battery, control circuitry, and an aerosol production assembly that is supplied power from the power source to transform an aerosol precursor material into an aerosol, the accessory comprising:

a sleeve portion configured to engage a portion of the aerosol generation device to operably couple the accessory to the aerosol generation device that is operable to transform the aerosol precursor material to the aerosol whether or not the accessory is operably coupled to the aerosol generation device;

a listening module;

an alerting module;

a power module configured to power the listening module and the alerting module, wherein the power module is operatively connected to the control circuitry of the aerosol generation device when the sleeve portion engages the aerosol generation device and the control circuitry is configured to supply power to the battery of the aerosol generating device from the power module of the accessory when the battery of the aerosol generating device is below a threshold level of charge, wherein the listening module is configured to receive an alert signal from a user, and wherein the alerting module is configured to issue an alert responsive to receipt of the alert signal by the listening module.

2. The accessory of claim 1, wherein the alerting module comprises a speaker configured to issue the alert as an audible sound.

3. The accessory of claim 1, wherein the alerting module is configured to issue the alert for a predetermined period of time.

4. The accessory of claim 1, wherein the alerting module is configured to issue the alert until an instruction to stop issuing the alert is received.

5. The accessory of claim 1, wherein the sleeve portion is formed in a housing of the accessory, and wherein the housing further comprises a charge port via which the power module is rechargeable from an external power source.

6. The accessory of claim 1, wherein the listening module is configured to receive the alert signal in the form of an audible key word or key sound.

7. The accessory of claim 6, wherein the audible key word or key sound is pre-programmed into the listening module by the user.

8. The accessory of claim 1, wherein the listening module is configured to receive the alert signal in the form of an audible tone played by a locating device, responsive to a request from the user.

9. The accessory of claim 8, wherein the audible tone is played responsive to activation of the locating device via an application executed by the user at the locating device.

10. The accessory of claim 9, wherein the application includes selectable icons for initiating the audible tone and stopping the audible tone.

11. The accessory of claim 1, wherein the listening module is configured to receive an audible alert signal from the user, and wherein the alerting module is configured to issue the alert responsive to receipt of the audible alert signal by the listening module.

12. A device locator system comprising:
an aerosol generation device that includes a power source comprising a battery, control circuitry, and an aerosol production assembly that is supplied power from the power source to transform an aerosol precursor material into an aerosol; and
an accessory configured to be operably coupled to the aerosol generation device that is operable to transform the aerosol precursor material to the aerosol whether or not the accessory is operably coupled to the aerosol generation device, the accessory comprising a listening module, an alerting module, and a power module configured to power the listening module and the alerting module, wherein the power module is operatively connected to the control circuitry of the aerosol generation device when a sleeve portion engages the aerosol generation device and the control circuitry is configured to supply power to the battery of the aerosol generating device from the power module of the accessory when the battery of the aerosol generating device is below a threshold level of charge,
wherein the listening module is configured to receive an alert signal from a user, and
wherein the alerting module is configured to issue an alert responsive to receipt of the alert signal by the listening module.

13. The system of claim 12, wherein the accessory comprises the sleeve portion configured to receive a portion of the aerosol generation device to operably couple the accessory to the aerosol generation device, and
wherein the alerting module comprises a speaker configured to issue the alert as an audible sound.

14. The system of claim 13, wherein the alerting module is configured to issue the alert for a predetermined period of time, or
wherein the alerting module is configured to issue the alert until an instruction to stop issuing the alert is received.

15. The system of claim 12,
wherein the sleeve portion is formed in a housing of the accessory, and wherein the housing further comprises a charge port via which the power module is rechargeable from an external power source.

16. The system of claim 15, wherein the power source of the aerosol generation device includes the battery, and a charging connector from which the battery is rechargeable, and
wherein the power module includes a charging interface configured to mate with the charging connector, and from which the power module is configured to provide power to the battery of the aerosol generation device.

17. The system of claim 12, wherein the listening module is configured to receive the alert signal in the form of an audible key word or key sound.

18. The system of claim 12, wherein the listening module is configured to receive the alert signal in the form of an audible tone played by a locating device, responsive to a request from the user.

19. The system of claim 18, wherein the audible tone is played responsive to activation of the locating device via an application executed by the user at the locating device.

20. The system of claim 19, wherein the application includes selectable icons for initiating the audible tone and stopping the audible tone.

21. The system of claim 12, wherein the listening module is configured to receive an audible alert signal from the user, and wherein the alerting module is configured to issue the alert responsive to receipt of the audible alert signal by the listening module.

22. An attachable accessory for device location of an aerosol generation device that includes a power source and an aerosol production assembly that is supplied power from the power source to transform an aerosol precursor material into an aerosol, the accessory comprising:
a sleeve portion configured to engage a portion of the aerosol generation device to operably couple the accessory to the aerosol generation device that is operable to transform the aerosol precursor material to the aerosol whether or not the accessory is operably coupled to the aerosol generation device;
a listening module;
an alerting module; and
a power module configured to power the listening module and the alerting module,
wherein the sleeve portion is formed in a housing of the accessory, and wherein the housing further comprises a charge port via which the power module is rechargeable from an external power source;
wherein the power source of the aerosol generation device includes a battery, and a charging connector from which the battery is rechargeable, and wherein the power module includes a charging interface configured to mate with the charging connector, and from which the power module is configured to provide power to the battery of the aerosol generation device,
wherein the listening module is configured to receive an alert signal from a user, and
wherein the alerting module is configured to issue an alert responsive to receipt of the alert signal by the listening module.

* * * * *